United States Patent
Chu

(10) Patent No.: US 9,109,687 B1
(45) Date of Patent: Aug. 18, 2015

(54) DIFFERENTIAL SYSTEM WITH A DIFFERENTIAL RATE GOVERNED BY AN AUXILIARY ELECTRIC MOTOR AND ITS ASSOCIATED METHOD OF OPERATION

(71) Applicant: Shaun J. Chu, Waltham, MA (US)

(72) Inventor: Shaun J. Chu, Waltham, MA (US)

(*) Notice: Subject to any disclaimer, the term of this patent is extended or adjusted under 35 U.S.C. 154(b) by 0 days.

(21) Appl. No.: 13/913,385

(22) Filed: Jun. 8, 2013

Related U.S. Application Data

(60) Provisional application No. 61/848,049, filed on Dec. 26, 2012.

(51) Int. Cl.
*F16H 48/30* (2012.01)
*F16H 48/34* (2012.01)

(52) U.S. Cl.
CPC ..................................... *F16H 48/34* (2013.01)

(58) Field of Classification Search
CPC ....................................................... F16H 48/34
USPC ......... 475/150, 200, 203, 204, 219, 221, 223, 475/226, 228, 230, 231, 333, 239, 5, 331; 180/65.265
See application file for complete search history.

(56) References Cited

U.S. PATENT DOCUMENTS

| | | | | |
|---|---|---|---|---|
| 1,382,289 | A * | 6/1921 | Janicki | 475/201 |
| 5,387,161 | A * | 2/1995 | Shibahata | 475/5 |
| 5,409,425 | A * | 4/1995 | Shibahata | 475/5 |
| 6,959,799 | B2 * | 11/2005 | Fusegi et al. | 192/84.6 |
| 7,273,436 | B2 * | 9/2007 | Hiroyuki et al. | 475/183 |
| 7,357,748 | B2 * | 4/2008 | Kelley, Jr. | 475/231 |
| 7,604,560 | B2 * | 10/2009 | Shiotsu et al. | 475/207 |
| 2009/0270214 | A1 * | 10/2009 | Nowak et al. | 475/159 |

* cited by examiner

*Primary Examiner* — David J Hlavka
(74) *Attorney, Agent, or Firm* — LaMorte & Associates, P.C.

(57) ABSTRACT

A system and method for selectively altering the rotational speed of one of the axles joined to a differential in order to keep that axle at optimal speed for a given set of conditions. In the system, a differential is attached to a driveshaft. A first axle is coupled to the differential, wherein the differential transfers rotational energy from the driveshaft to the first axle. This causes the first axle to rotate at a second rotational speed when the driveshaft turns at a first rotational speed. An electric motor is provided that is mechanically coupled to the first axle for selectively altering the second rotational speed. The electric motor is variable, therein enabling the second rotational speed to be altered as needed. Changes in the rotational speed of the first axle are imparted to a second axle through the gearing of the differential.

8 Claims, 5 Drawing Sheets

DIFFERENTIAL SYSTEM WITH A DIFFERENTIAL RATE GOVERNED BY AN AUXILIARY ELECTRIC MOTOR AND ITS ASSOCIATED METHOD OF OPERATION

RELATED APPLICATIONS

The application claims the benefit of provisional patent application No. 61/848,049 entitled "Steering Differential", filed Dec. 26, 2012.

BACKGROUND OF THE INVENTION

1. Field of the Invention

In general, the present invention relates to axle differentials, such as those used as part of the drive train on automobiles. More particularly, the present invention relates to differentials that contain active mechanisms to compensate for slip in at least one of the axles.

2. Prior Art Description

Most automobiles have engines and transmissions. The engine and transmission is used to turn a driveshaft. The driveshaft is connected to a differential. The differential transfers the rotational energy of the driveshaft to the axles and wheels of the automobile.

When an automobile is driving in a straight line, the wheels on the left side of the vehicle and the wheels on the right side of the vehicle rotate at the same speed. However, when the automobile makes a turn, the wheels on the outside of the turn must travel farther than the wheels on the inside of the turn. Consequently, the wheels on the outside of the turn must rotate at a slightly faster rate than the inside wheels during the turn. The use of differentials enables opposing axles on opposite sides of the vehicle to rotate at different speeds. As such, the wheels of the vehicle can each rotate at the proper speed to accommodate a turn.

Most prior art differentials are designed assuming that the wheels of the automobile will be encountering good road conditions. In real life, this is not always the case. Roads are often covered in snow, ice, dirt, gravel, mud and the like that can make a wheel skid slightly during a turn. In such situations, differentials may misinterpret the conditions and allow too much power to be applied to the slipping wheel. This can adversely affect the safety of the vehicle.

In attempts to limit such traction problems, some vehicle manufacturer's use limited-slip differentials. A limited-slip differential is a type of automotive differential gear arrangement that allows for some difference in angular velocity of the output shafts, but imposes mechanical boundaries on the disparity. In an automobile, such limited-slip differentials are sometimes used in place of a standard differential, where they convey certain dynamic advantages, at the expense of greater complexity. In the prior art, there are many different types of limited slip differentials. However, the present invention relates generally to electronic limited slip differentials. In an electronic limited slip differential, sensors and various electromechanical components are used to automatically adjust the differential depending upon driving speed and traction conditions. Such prior art is exemplified by U.S. Pat. No. 7,357,748 to Kelly, entitled Limited Slip Differential.

Prior art electronic limited slip differentials have certain innate problems. Being limited slip differentials, such prior art differentials do allow for some slip of the axles and wheels, albeit that the slip is limited in range. Under certain circumstances, even limited slip can detract from the safety of a vehicle. Torque transfer is another common problem associated with limited slip differentials. Limited slip differentials endeavor to redirect torque to the axle with the most traction. However, some torque is always lost to the axle of the slipping wheel. Furthermore, differentials are traditionally mechanical devices. The addition of electronics to differentials has increased their complexity and corresponding cost of manufacture. The use of electronic controls within the differential makes the differential expensive to build and difficult to repair.

A need therefore exists for an improved differential system that precisely controlled at all times and allows for no significant slip in the controlled axles. A need also exists for a differential that has the precision of electronic controls, yet is simple and inexpensive to manufacture. These needs are met by the present invention as described and claimed below.

SUMMARY OF THE INVENTION

The present invention is a system and method for selectively altering the rotational speed of the axles joined to a differential in order to keep those axles at optimal speed for a given set of conditions. The system includes a differential that is attached to a driveshaft. A first and second axle are coupled to the differential, wherein the differential transfers rotational energy from the driveshaft to the axles.

An electric motor is provided that is mechanically coupled to the first axle for selectively altering the rotational speed of the first axles. The change in rotational speed imparted to the first axles is transferred to the second axles through the gearing of the differential. The electric motor is used to govern the differential rotation of the axles independent of traction conditions. This effectively eliminates any slipping due to unequal traction conditions.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied in many ways for use on different vehicles, the embodiment illustrated shows the system being used on a vehicle having rear wheel drive. This embodiment is selected in order to set forth one of the best modes contemplated for the invention. The illustrated embodiment, however, is merely exemplary and should not be considered a limitation when interpreting the scope of the appended claims.

Figure 1:
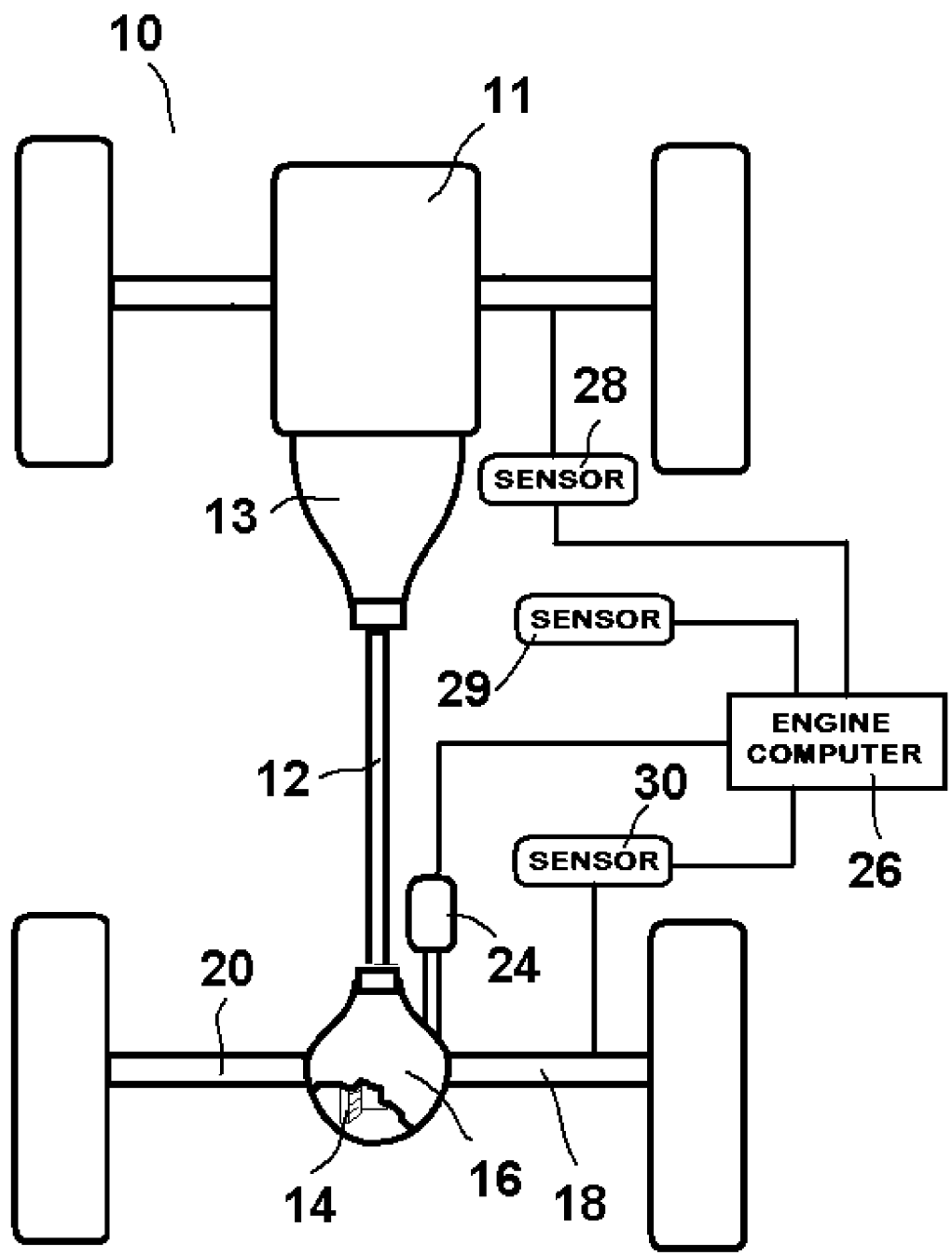
FIG. 1 is a schematic showing the major electrical and mechanical components of the present invention system.

Referring to FIG. 1, an overview of a vehicle is shown that contains the present invention system 10. The vehicle has an engine 11 and a transmission 13 that turns a driveshaft 12. The driveshaft 12 is connected to a gearing assembly 14 held within a differential casing 16. The differential casing 16 protects the gear assembly 14 and holds oil about the gear assembly 14.

The gearing assembly 14 transfers the rotational energy of the driveshaft 12 to two rear axles 18, 20. The axles 18, 20 rotate the rear wheels 21, 22 of the vehicle. As will later be explained, the rotational speed transferred to each of the rear axles 18, 20 depends upon various conditions.

The gearing assembly 14 is also acted upon by an electric motor 24. The electric motor 24 is controlled by the engine computer 26 of the vehicle. The control signals sent to the electric motor 24 by the engine computer 26 depend upon inputs received from three primary sensor sets. Those sensor sets include a steering angle sensor 28, a driveshaft rotational velocity sensor 29, and axle rotational velocity sensors 30.

Figure 2:
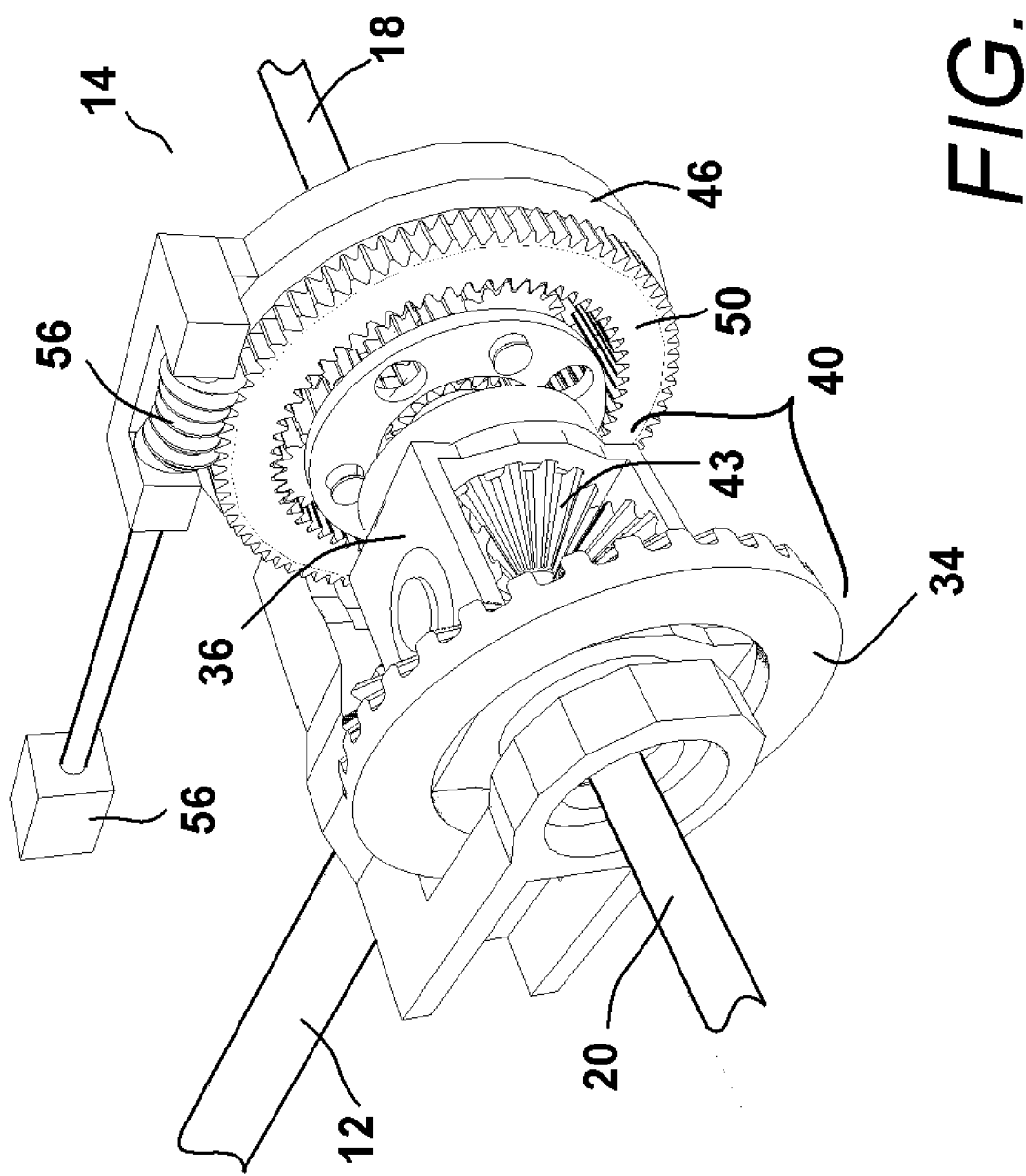
FIG. 2 is a perspective view showing the gearing assembly held within the differential casing.
Figure 3:
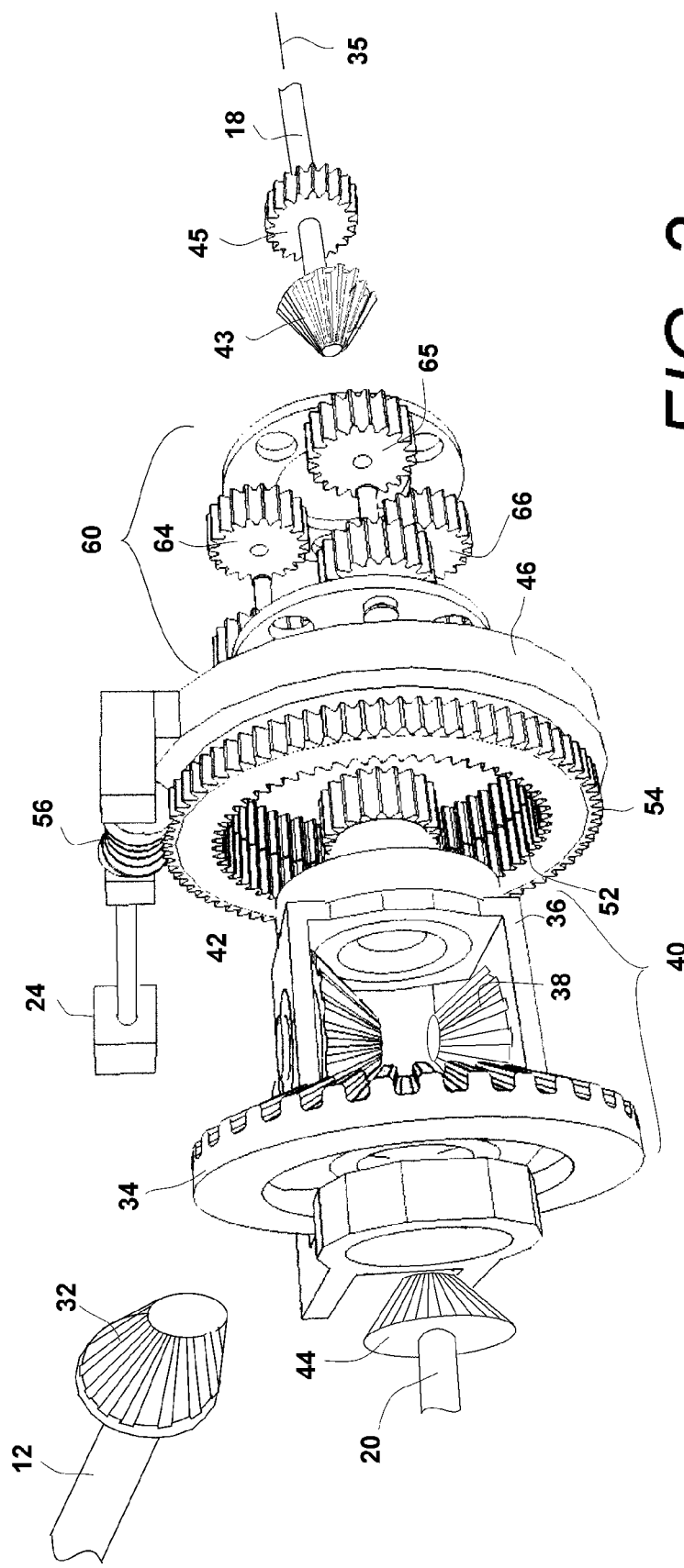
FIG. 3 is an exploded perspective view of the gearing assembly shown in FIG. 2.

Referring to FIG. 2 in conjunction with FIG. 3, the details of the gearing assembly 14 contained within the differential casing 16 are shown. Within the gearing assembly 14, the driveshaft 12 terminates with a traditional beveled pinion gear 32. The pinion gear 32 turns a large beveled ring gear 34 that is set about the primary axis of rotation 35 of the two rear axles 18, 20. The beveled ring gear 34 is attached to a miter gear carrier 36. The miter gear carrier 36 turns with the beveled ring gear 34. The miter gear carrier 36 carries either one or two miter gears 38. In the shown embodiment, two miter gears 38 are shown. The miter gears 38 are oriented at a perpendicular to the primary axis of rotation 35 in the traditional manner.

The beveled pinion gear 32, beveled ring gear 34, miter gear carrier 36 and miter gears create a traditional differential 40. These components are herein referred to collectively as the differential 40.

Unique to the present invention is that a sun gear 42 is also affixed to the miter gear carrier 36. The sun gear 42 is oriented on the primary axis of rotation 35. It will therefore be understood that the sun gear 42 rotates with the beveled ring gear 34 and the miter gear carrier 36 of the differential 40.

Both axles 18, 20 terminate with beveled drive gears 43, 44. The second axle 20 extends through the beveled ring gear 34, wherein its beveled drive gear 44 intermeshes with the beveled miter gears 38 in the miter gear carrier 36 of the differential 40. Conversely, the first axle 18 extends through the center of the sun gear 42, wherein its beveled drive gear 43 intermeshes with the beveled miter gears 38 in the miter gear carrier 36 of the differential 40. The first axle 18 also contains a spur gear 45 on its exterior that is anchored to the first axle 18.

A stationary internal spur gear 46 is provided. The stationary internal spur gear 46 is connected to the differential casing 16 and therefore does not move. An annular gear 50 is also provided. The annular gear 50 has both interior gear teeth 52 and exterior gear teeth 54. In the shown embodiment, the interior of the annular gear 50 is the same size and has the same gearing as does the interior of the internal spur gear 48. However, these dimensions and gearing types can be altered depending upon numerous factors, such as wheel size and vehicle type to optimize performance. The annular gear 50 is positioned around the sun gear 42 of the miter gear carrier 36.

A worm gear 56 engages the exterior gear teeth 54 of the annular gear 50. The worm gear 56 is stationary, being anchored to the differential casing. The worm gear 56 is selectively rotated by the electric motor 24. As the worm gear 56 turns, it intermeshes with the exterior gear teeth 54 of the annular gear 50 and causes the annular gear 50 to turn. Since the worm gear 56 can be rotated by the electric motor 24 at different speeds, it will be understood that the annular gear 50 can also be selectively rotated at different speeds.

Figure 4:
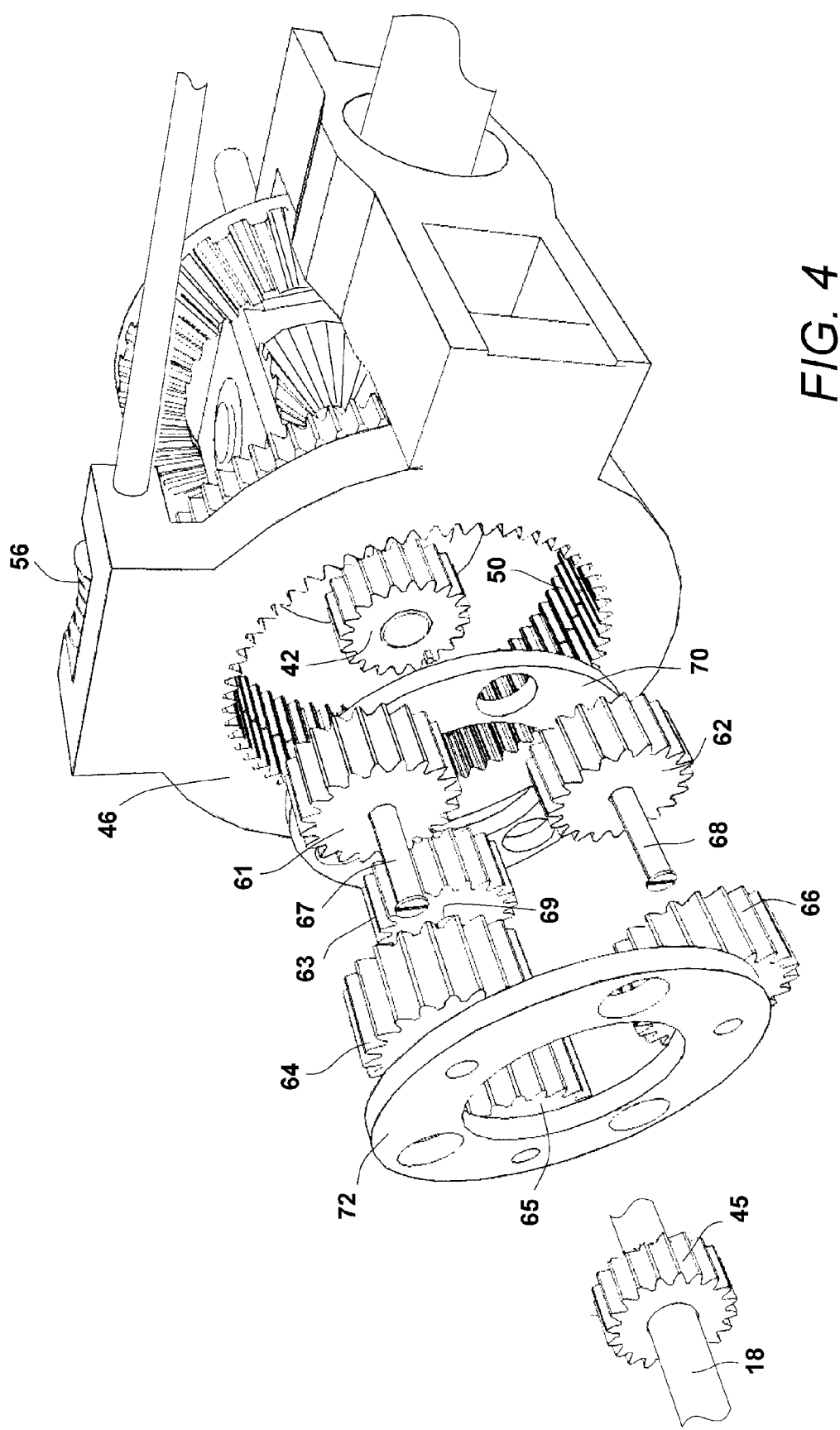
FIG. 4 is an exploded reverse perspective view of the gearing assembly.

Referring to FIG. 4 in conjunction with FIG. 3, it can be seen that a subassembly 60 of planetary gears is provided. The subassembly 60 includes six planetary gears 61, 62, 63, 64, 65, 66, set into a framework of three pins 67, 68, 69 between two endplates 70, 72. The planetary gears 61, 62, 63, 64, 65, 66 are arranged in two sets of three. The first set of planetary gears 61, 62, 63 orbits the sun gear 42 and joins the sun gear 42 to the interior gear teeth 52 of the annular gear 50. The second set of planetary gears 64, 65, 66 orbit the spur gear 45 on the first axle 18 and joins the spur gear 45 to the internal spur gear 46. The use of six planetary gears 61, 62, 63, 64, 65, 66 is merely exemplary and it will be understood that any number of planetary gears can be used provided the described transfer of mechanical energy between components is achieved.

It will be understood that when the miter gear carrier 36 within the differential 40 turns, the sun gear 42 also turns. The sun gear 42 turns the first set of planetary gears 61, 62, 63. The orbital movement of the first set of planetary gears 61, 62, 63 is transferred to the second set of planetary gears 64, 65, 66 by the pins 67, 68, 69. The second set of planetary gears 64, 65, 66 turns the spur gear 45 on the first axle 18. The spur gear 45 turns the first axle 18 and any vehicle wheel that is attached to that first axle 18. Consequently, by the various interconnections, the orbital speed of the first set of planetary gears 61, 62, 63 is proportional to the rotational speed of the first axle 18.

The orbital speed of the first set of planetary gears 61, 62, 63 can be selectively adjusted by the operation of the worm gear 56 by the electric motor 24. As the worm gear 56 is turned, it causes the annular gear 50 to rotate. Depending upon its direction of rotation, the rotation of the annular gear 50 will either increase the orbital speed of the first set of planetary gears 61, 62, 63 or decrease the speed of the same. Since the orbital speed of the first set of planetary gears 61, 62, 63 is proportional to the rotational speed of the first axle 18, it will be understood that the turning of the worm gear 56 either increases or decreases the rotational speed of the first axle 18. Accordingly, by operating the electric motor 24, the rotational speed of the first axle 18 can be selectively increase or decrease. The action of differential 40 will impart an equal and opposite rotational speed on second axle 20. The two axles 18 and 20 are always coupled together and rotate together equally unless a difference is allowed via the rotation of the worm gear 56. Should the electric motor 24 fail, the worm gear 56 would not turn. The differential 40 still operates and the two axles 18, 20 remain free to rotate together at a common rate of rotation.

Figure 5:
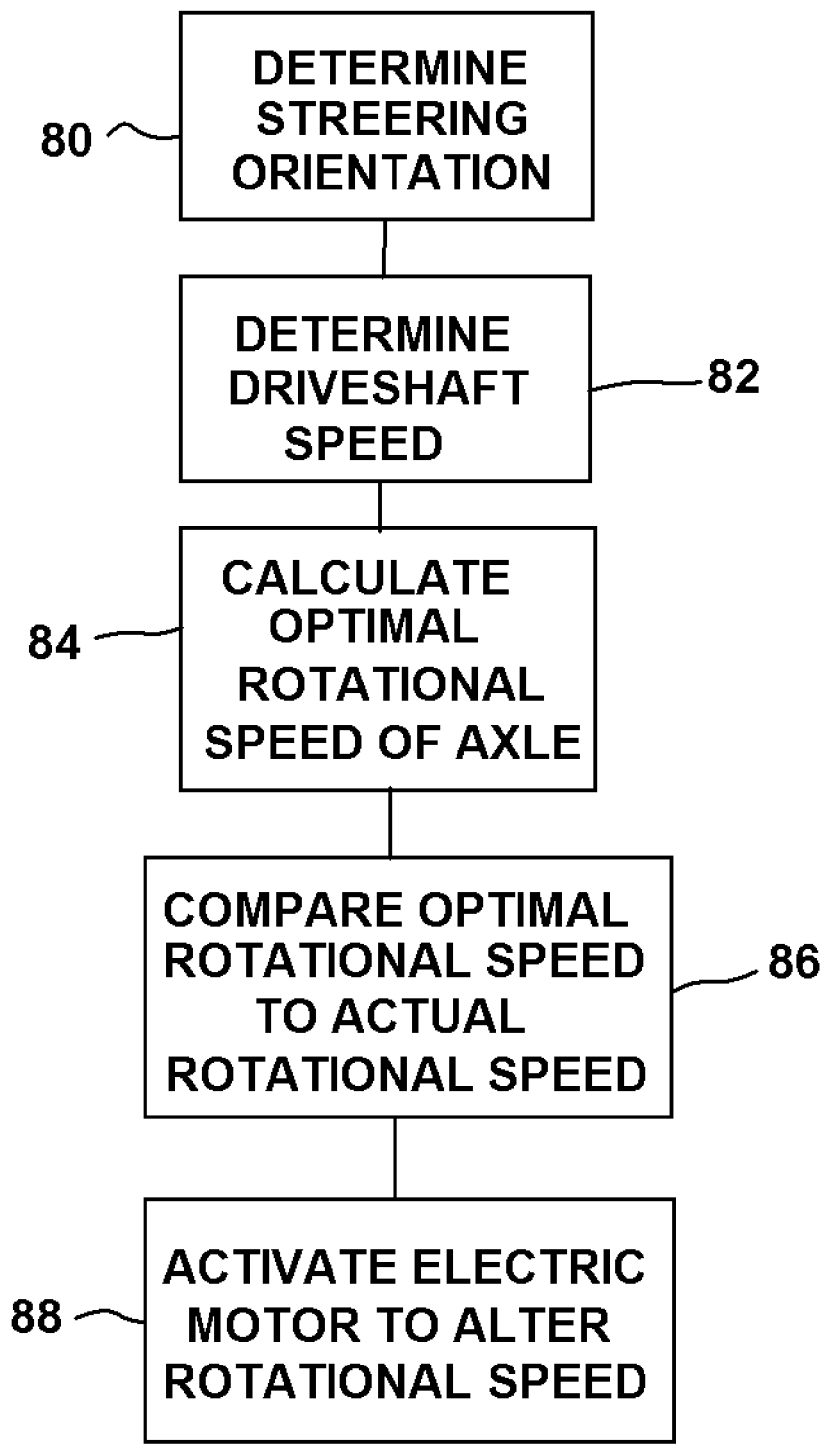
FIG. 5 is a block flow diagram showing the operating method employed by the present invention system.

Referring lastly to FIG. 5 in conjunction with FIG. 1, the operating methodology of the present invention system 10 is explained. From the description previously provided, it is understood that by operating the electric motor 24, the speed of the rear axles 18 can be increased or decreased depending upon the direction that the electric motor 24 turns. The increase or decrease in speed is affected by the rotation of the electric motor 24.

Using the steering angle sensor 28, the engine computer 26 can determine if the vehicle 10 is configured to travel straight, configured to travel in a left turn, or configured to travel in a right turn. See Block 80. Furthermore, using the rotational velocity sensor 29, the RPMs of the driveshaft 12 can be determined. See Block 82. As is indicated by Block 84, the engine computer 26 calculates the optimal speed of the first axle 18, considering the steering adjustments of the vehicle and the rotational speed of the driveshaft 12. The optimal rotational speed of the first axle 18 is then compared to the actual rotational speed of the first axle 18. See Block 86. The differential between the optimal rotational speed and the actual rotational speed is then converted into a control signal value that is sent to the electric motor 24. The electric motor 24 then operates to speed up or slow down the actual rotational speed of the first axle 18 so that its speed more closely approaches the optimal rotational speed. See Block 88. Changes in speed to the first axle 18 are conveyed to the second axle 20 through the gearing of the differential 40. As such, the present invention system 10 governs the differential rotation of each axle independent of traction conditions via the rotation of the worm gear. Slipping due to unequal traction conditions will therefore be prevented from occurring at all.

It will be understood that the embodiment of the present invention system that is illustrated and described is merely exemplary and that a person skilled in the art can make many variations to that embodiment. All such embodiments are intended to be included within the scope of the present invention as defined by the claims.

What is claimed is:

1. An assembly comprising:
   a differential having a differential housing, said differential containing a bevel ring gear, a miter gear carrier affixed to said bevel ring gear and a sun gear affixed to said miter gear carrier, wherein said miter gear carrier supports at least one miter gear, and wherein said miter gear carrier and said sun gear rotate with said bevel ring gear;
   a driveshaft coupled to a pinion gear that intermeshes with said bevel ring gear within said differential;
   a first axle having a bevel drive gear and an externally toothed spur gear affixed thereto, wherein said first axle extends into said differential, wherein said bevel drive gear intermeshes with said at least one miter gear in said miter gear carrier;
   an internally toothed spur gear set in a fixed position within said differential housing;
   an annular gear concentrically aligned with said internally toothed spur gear;
   a subassembly of planetary gears that interconnect said sun gear, said internally toothed spur gear, said annular gear and said externally toothed spur gear on said first axle, wherein said differential transfers rotational energy from said driveshaft to said first axle, therein causing said first axle to rotate at a second rotational speed when said driveshaft turns at a first rotational speed; and
   an electric motor that selectively turns said annular gear, therein selectively altering said second rotational speed of said first axle.

2. The assembly according to claim 1, further including a second axle coupled to said differential, wherein said differential transfers rotational energy from said driveshaft to said second axle, therein causing said second axle to rotate at a third rotational speed.

3. The assembly according to claim 1, wherein said motor is variable in speed and capable of turning said annular gear at variable speeds.

4. The assembly according to claim 1, wherein said annular gear has both interior gear teeth and exterior gear teeth.

5. The assembly according to claim 4, further including a worm gear that intermeshes with said exterior gear teeth of said annular gear, wherein said worm gear is rotated by said electric motor.

6. The assembly according to claim 2, wherein said differential imparts an equal and opposite rotational speed to second axle, wherein said first axle and said second axle are coupled by said differential and rotate together less a difference created by said electric motor.

7. The assembly according to claim 4, wherein said subassembly of planetary gears intermesh with both said externally toothed spur gear and said interior gear teeth of said annular gear.

8. The assembly according to claim 7, wherein said subassembly of planetary gears are joined to said differential and are caused to orbit about said externally toothed spur gear by said differential.

\* \* \* \* \*